United States Patent Office 3,812,123
Patented May 21, 1974

3,812,123
U.V.-ABSORBING ORTHO-HYDROXYPHENYL SUBSTITUTED PHENANTHROLINES
Jan-Erik Anders Otterstedt, Simrishamn, Sweden, and Richard Pater, Wilmington, Del., assignors to E. I. du Pont de Nemours and Company, Wilmington, Del.
No Drawing. Original application Feb. 24, 1969, Ser. No. 801,842, now Patent No. 3,660,404. Divided and this application Dec. 13, 1971, Ser. No. 207,617
Int. Cl. C07d 39/14
U.S. Cl. 260—288 P     5 Claims

ABSTRACT OF THE DISCLOSURE

Ultraviolet absorbing phenanthroline of the formula

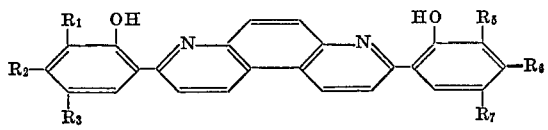

wherein $R_{1-3}$ and $R_{5-7}$ are selected from H, Cl, OH, $C_{1-18}$ alkyl, $C_{1-18}$ alkoxy and $C_{1-18}$ acyloxy, and process for preparing same.

CROSS-REFERENCE TO RELATED APPLICATION

This application is a division of application Ser. No. 801,842, filed Feb. 24, 1969 and issued May 2, 1972 as U.S. 3,660,404.

BACKGROUND OF THE INVENTION

1. Field of the invention

This invention concerns novel ultraviolet absorbing bis(hydroxyphenyl) compounds highly resistant to degradation by ultra-violet light and useful as light screens and photostabilizers.

2. Description of the prior art

Degradative effects of ultra-violet light on various materials are well known. The problem is especially acute with polymeric materials subject to exposure to sunlight for long periods of time, and the art has proposed to use various additives as ultra-violet screens or photostabilizers.

One important photo-stabilizer class includes hydroxyaryl-substituted aromatic compounds wherein the hydroxyl hydrogen is H-bonded to an electron donating element of the conjugated system, such as carbonyl oxygen or imino-nitrogen. Such compounds in general are believed to function as ultra-violet screens by absorbing ultra-violet light, whereby they are raised to a higher energy state, internally converting the absorbed energy to relatively innocuous vibrational energy within the molecular framework, and transferring the converted energy to the surroundings as heat. Thus, by such radiation-less process, the photoexcited molecule decays to its ground state where it again becomes available to absorb incident light and repeat the energy-dissipating process.

Many commercially available photostabilizers, including o-hydroxyaryl benzophenones and o-hydroxyaryl benzotriazoles, are not entirely satisfactory, particularly for longtime use, as they are somewhat limited in their ability to dissipate their absorbed light energy through radiationless decays. Accordingly, during each cycle some fraction of the photoexcited UV-absorber undergoes side reactions, either decomposing or attacking its surroundings, with the result that gradually on prolonged exposure the effective concentration of the UV-screen is depleted and the substrate deteriorates.

OBJECTS AND SUMMARY OF THE INVENTION

It is accordingly among the objects of the present invention to provide new ultra-violet absorbers with high inherent photostability, that is, that internally dissipate their absorbed light energy with high efficiency. Another object is to provide such photostabilizers readily adapted for use as ultra-violet screens in a wide variety of substrates. A still further object is to provide novel processes for the preparation of the subject compounds.

These and other objectives are accomplished according to the present invention by:
A. Novel compounds of the formula

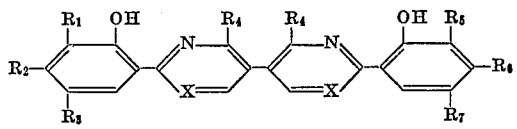

where
X=N, CH or C—CN,
$R_4$=H when taken singly or —CH=CH— when taken together, and
$R_1$ to $R_3$ and $R_5$ to $R_7$=H, Cl, OH, alkyl, alkoxy or acyloxy.

Preferred bipyrimidyls (where X=N and $R_4$=H) include 2,2'-bis(o-hydroxyphenyl)-5,5'-bipyrimidyl and 2,2'-bis-(o,p-dihydroxyphenyl)-5,5'-bipyrimidyl. Preferred bipyridyls (X=CH and $R_4$=H) include 6,6'-bis(p-hydroxyphenyl)-3,3'-bipyridyl and 6,6'-bis(o,p-dihydroxyphenyl)-3,3'-bipyridyl. Preferred phenanthrolines (X=CH and $R_4$ taken together is —CH=CH—) include 3,8-bis(o-hydroxyphenyl) - 4,7 - phenanthroline and 3,8-bis(o,p-dihydroxyphenyl)-4,7-phenanthroline. Normally the alkyl, alkoxy and acyloxy are essentially aliphatic groups containing from 1 to about 18 carbons, as exemplified hereinafter, but they may also represent larger groups such as polymeric residues, as these do not change the essential photostable character of the defined ring systems;
B. Photodegradation-prone substrates, especially polymeric substrates, photostabilized by incorporation of the subject compounds;
C. Novel processes for preparing bipyrimidyls and bipyridyls including condensing an amidine or beta-aminocinnamonitrile of the formula

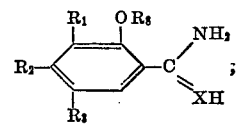

where
$R_1$ to $R_3$ are as defined above,
$R_8$=H or an inert blocking group, and
X=N or C—CN,
with a tetraformylethane derivative of the formula

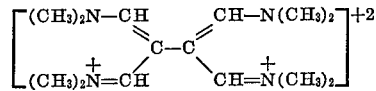

in a solvent containing an acid-binding agent in an amount providing at least about one hydrogen ion equivalent of acid-binding agent per molecule of the amidine or beta-aminocinnamonitrile employed taken as the free base. The amidine is usually in the form of a salt of a mineral acid, preferably an amidinium sulfate; and
D. A novel process for preparing phenanthrolines including the steps of condensing a salicylaldehyde of the formula

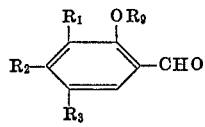

where $R_1$ to $R_3$ are as defined above and
$R_9$=H or lower alkyl, with a p-acylamidoaniline and pyruvic acid, deacylating and decarboxylating the resulting 2-(o-hydroxy- or o-alkoxyphenyl)-4-carboxyl-6-acylaminoquinoline, condensing the resulting 2-(o-hydroxy- or o-alkoxyphenyl)-6-aminoquinoline compound with another molecule of the salicylaldehyde and pyruvic acid, and decarboxylating the resulting 3,8-bis(o-hydroxy- or o-alkoxyphenyl)-4,7-phenanthroline-1-carboxylic acid. Where $R_9$ is a lower alkyl, an additional dealkylating step may be employed to convert the o-alkoxyphenyl rings to o-hydroxyphenyl.

Other preferred embodiments are discussed in more detail hereinafter.

DETAILED DESCRIPTION OF INVENTION

Bases for the invention

This invention is based on the discovery that the bis-(o-hydroxyphenyl)bipyrimidyls, bipyridyls and phenanthrolines wherein the o-hydroxyphenyl groups are positioned such that the phenolic hydrogens can internally hydrogen bond to the aromatic nitrogen atoms of the heterocyclic ring systems have high extinction coefficient in the near ultra violet, are remarkably stable to such ultraviolet light, and thus have high inherent utility as UV-screens. The o-hydroxy-phenyl moieties may be variedly substituted, as defined, without adversely affecting the inherent photostability. Thus, introducing appropriate substituents (to modify such optical properties as the extintion coefficient and specific absorptivity and such physical properties as solubility in and compatibility with polar and non-polar substances) affords a wide variety of derivatives readily adapted for use in a wide variety of substrates as UV-screens and photostabilizers.

Without limiting the invention to a particular interpretation, it is considered that photosability in general is determined by how rapidly and efficiently photoexcited UV-absorbing molecules return to their ground states before they decompose or react with their surroundings. The high photostability of the invention compounds may be explained with reference to the normal ground imino-enol State I, its somewhat higher energy amino-keto tautomeric form II, and the corresponding excited states, I* and II*. States I and II may be illustrated as:

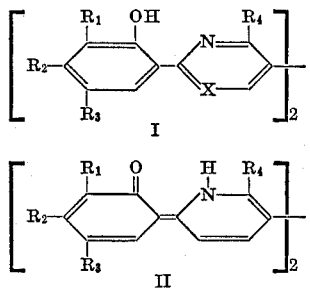

States I* and II* can only be described speculatively, but are considered in theory to differ from I and II in having electrons in higher (less stable) energy levels.

In this scheme, which is summarized in equations 1–4 below, (1)     $I \xrightarrow{UV\text{-light}} I^*$ (2)     $I^* \longrightarrow II^*$ (3)     $II^* \longrightarrow II + \text{heat}$ (4)     $II \longrightarrow I + \text{heat,}$ photo-excited I* dissipates its absorbed energy essentially through conversion to II*, involving energy-absorbing-electron bond shifts and atom movements accompanying such shifts, as well as through the usual bond vibrations spreading energy over the entire molecular framework. II* evidently corresponds to a relatively low-energy activated state which readily decays vibrationally with heat loss, to its ground state which reverts to I, by simple hydrogen and electron shifts, also with heat loss to the surrounding substrate molecules.

The high photostability of the invention compounds is attributable both to the strategically positioned o-hydroxy-aryl groups and to the fact that the heteroaryl rings are coupled in a bi-aryl relationship with the coupling bond para to the hydroxyphenyl groups.

Preparation

Bypyrimidyls and bipyridyls of this invention are conveniently obtained by condensing an appropriately substituted amidine or a beta-aminocinnamonitrile with tetraformyl ethane or precursors thereof, such as (for ease of handling) a mineral acid salt of the amidine or aminonitrile component, and 1,4-bis (dimethylamino)-2,3-bis (dimethyliminiummethyl)-1,3-butadiene (preferably in association with perchlorate ion or other salt-forming anion).

A preferred process is illustrated by the equation

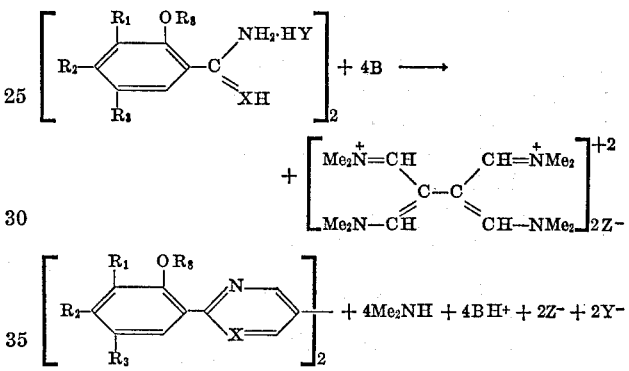

where X and $R_1$ to $R_3$ are as defined above; $R_8$ stands for hydrogen or a readily removable blocking group such as alkyl, allyl or benzyl; HY is HCl, $H_2SO_4$, $H_3PO_4$ or other mineral acid; Z is a salt-forming anion such as Cl⁻, $SO_4$=, or $ClO_4$=; and B is an acid binding agent such as NaOH, $NaOC_2H_5$, $K_2CO_3$, $Ca(OH)_2$ or other available alkali metal, alkaline earth, metal hydroxide, carbonate or alkoxide. The acid-binding agent should be present in an amount providing at least one (and preferably at least two) hydrogen ion equivalent of acid-binding agent per molecule of amidine or beta-amino-cinnamonitrile employed taken as the free base.

The condensation is normally run in aqueous or alcoholic media (e.g., ethanol) at 25–100° C., but other media may be used wherein the reactants are soluble and preferably the bipyrimidyl or bipyridyl is insoluble for ready recovery. The bipyrimidyl or bipyridyl products, normally solids, may be recovered from the reaction mass and purified, if necessary, by conventional means including solvent extraction, crystallization from solvents and sublimation, as more particularly illustrated in the Examples. With amidines (X=N) as reactants $OR_8$ is normally OH, and bipyrimidyls with the desired bis(o-hydroxyphenyl) moieties are obtained directly in the above method. The amidines are available from the corresponding amides via the iminochlorides or iminoethers by reaction with ammonia according to known methods. One advantageous method discovered herein involves reacting the iminoether hydrochloride derivative of the amide with ammonium carbonate as illustrated in the Examples.

Representative o-hydroxy-benzamidines include o-hydroxybenzamidine, 2,4-dihydroxybenzamidine, 2-hydroxy-4-methoxybenzamidine, 2-hydroxy-4-butoxybenzamidine, 2-hydroxy-4,5-dimethoxybenzamidine, 2-hydroxy-5-methylbenzamidine, 2-hydroxy-5-tert-butylbenzamidine, 2-hydroxy-5-chlorobenzamidine, and 2-hydroxy-3,5-dichlorobenzamidine. Mixtures of such benzamidines may be employed, if desired to produce mixtures of the corresponding bipyrimidyls.

Typical 5,5'-bipyrimidyls of this invention that may be prepared by the above method are 2,2'-bis(o-hydroxyphenyl)-;
2,2'-bis(o,p-dihydroxyphenyl)-;
2,2'-bis(o-hydroxy-p-methoxyphenyl);
2,2'-bis(o-hydroxy-p-butoxyphenyl)-;
2,2'-bis(2-hydroxy-4,5-dimethoxyphenyl)-;
2,2'-bis(2-hydroxy-5-methylphenyl)-;
2,2'-bis(2-hydroxy-5-tert.butylphenyl)-;
2,2'-bis(2-hydroxy-5-chlorophenyl)-;
2,2'-bis(2-hydroxy-3,5-dichlorophenyl)-;
2-(o-hydroxyphenyl)-2'-(o-hydroxy-p-methoxyphenyl)-; and
2-(2-hydroxy-5-methylphenyl)-2'-(2-hydroxy-4-ethoxyphenyl)-5,5'-bipyrimidyl.

Beta-aminocinnamonitriles useful in the process scheme of this invention are conveniently prepared by condensing appropriately substituted o-hydroxy benzonitriles with acetonitrile in the presence of sodium hydride in tetrahydrofuran. The o-hydroxy group of the benzonitrile is suitably blocked from reaction with sodium hydride by first alkylating with methyl, allyl, benzyl or the like inert and readily removable groups according to well-known methods. Typical beta-aminocinnamonitriles include in addition to the o-methoxy derivative the following: 2-methoxy-4-methyl-; 2-methoxy-4,5-dimethyl-; 2-methoxy-5-butyl-; 2-methoxy-5-chloro-; 2-methoxy-3,5-dichloro-; 2,4-dimethoxy-; 2-allyloxy-5-amyloxy-; and 2,4,5-trimethoxy-beta-aminocinnamonitrile. Mixtures of beta-aminocinnamonitrile may be used.

The bipyridyls first formed according to the above scheme,

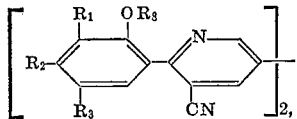

may be converted to the desired photostable structure by removing the blocking groups, hydrolyzing the cyano groups at the 5,5'-position to produce the dicarboxylic acid, and then decarboxylating, e.g. by heating with copper in quinoline.

Dealkylating the O-alkylated oxygroups may be effected by methods known to the art for cleaving alkyl aryl ethers, e.g. by heating with concentrated hydrobromic acid. Alkoxy groups present at other ring positions may also be cleaved under these conditions. Thus bis(polyhydroxyphenyl) pyridyls can be prepared starting from polyalkoxybenzonitriles. On the other hand, when o-hydroxy-alkoxy substituted bipyridyls are desired, i.e. where one or more of the $R_1$ to $R_3$ groups are alkoxyl the hydroxyls at these positions can be selectively alkylated as described below. Representative 3,3'-bipyridyls that may be prepared by the above reaction scheme include the parent 6,6'-bis(o-hydroxyphenyl)-derivative and the following further substituted derivatives thereof:

6,6'-bis(2,4-dihydroxyphenyl)-;
6,6'-bis(2,4,5-trihydroxyphenyl)-;
6,6'-bis-(2-hydroxy-4-methylphenyl)-;
6,6'-bis(2-hydroxy-4,5-dimethylphenyl)-;
6,6'-bis(2-hydroxy-5-butylphenyl)-;
6,6'-bis(2-hydroxy-5-chlorophenyl)-;
6,6'-bis(2-hydroxy-3,5-dichlorophenyl)-;
6-(o-hydroxyphenyl)-6'-(o,p-dihydroxyphenyl)-;
6-(2-hydroxy-4-methylphenyl)-6'-(2-hydroxy-5-chlorophenyl)-3,3'-bipyridyl;

and the corresponding bipyridyls bearing cyano-groups at the 5 and 5' positions.

3,8 - bis(o-hydroxyphenyl)-4,7-phenanthrolines of this invention can be prepared using a double Doebner pyruvic acid synthesis, preferably applied stepwise. This involves (1) condensing an appropriately substituted salicylaldehyde or o-alkoxybenzaldehyde, pyruvic acid and p-acylamidoaniline (preferably p-acetamidoaniline) to yield a 2 - (o-hydroxy- or o-alkoxyaryl)-4-carboxy-6-acylamidoquinoline, e.g.,

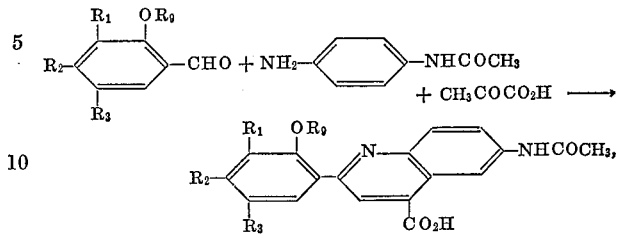

where $R_9$=H or lower alkyl, (2) saponifying to deacylate the blocked amino group, (3) decarboxylating, e.g. by heating with copper in quinoline, (4) repeating the Doebner reaction on the aminoquinoline with the same or a different substituted benzaldehyde to yield

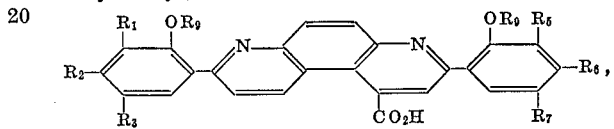

which is (5) decarboxylated as before and (6) dealkylated e.g. by heating with conc. hydrobromic acid. When $R_{1-3}$ and $R_{5-7}$ include alkoxy groups, these may also be cleaved by the HBr treatment. This can be advantageous, for the resulting compounds wherein one or more of $R_{1-3}$ and $R_{5-7}$ are hydroxyl can be further reacted with alkylating or acylating agents to introduce desired alkyl groups and acyl groups as disclosed below. Typical substituted benzaldehydes that may be used to prepare photostable phenanthrolines of this invention include 2-methoxy-; 2-methoxy-4-methyl-; 2-methoxy-4,5-dimethyl-; 2-methoxy - 5-butyl; 2methoxy-5-chloro; 2-methoxy-3,5-dichloro-; 2,4 - dimethoxy-; 2,4,5-trimethoxybenzaldehyde; and mixtures thereof. Thus this method affords the following representative 4,7-phenanthrolines:

3,8-bis(o-hydroxyphenyl)-;
3,8-bis(o,p-dihydroxyphenyl)-;
3,8-bis(2,4,5-trihydroxyphenyl)-;
3,8-bis(2-hydroxy-4-methylphenyl)-;
3,8-bis(2-hydroxy-4,5-dimethylphenyl)-;
3,8-bis(2-hydroxy-5-butylphenyl)-;
3,8-bis(2-hydroxy-5-chlorophenyl)-;
3,8-bis(2-hydroxy-3,5-dichlorophenyl)-;
3-(o-hydroxyphenyl)-8-(o,p-dihydroxyphenyl)-; and
3-(2-hydroxy-4-methylphenyl)-8-hydroxy-5-chlorophenyl)-4,7-phenanthroline.

Still other bipyrimidyls, bipyridyls and phenanthrolines that may be prepared by the above methods will occur to those skilled in the art. The amidines, beta-aminocinnamonitriles and aldehydes required to produce any particular bipyridyl, bipyrimidyl or phenanthroline desired are readily identified by inspection of those structures.

Bipyrimidyls, bipyridyls and phenanthrolines of this invention may also be prepared by condensing 2,2'-dichloro-5,5' - bipyrimidyl, 6,6'-dichloro-3,3'-bipyridyl, or 3,8-dichloro-4,7-phenanthroline with 2 molar proportions of a hydroxyarene which is unsubstituted at a position ortho to the hydroxy group and preferably is substituted at the position para to the hydroxy group, such as phenol, p-methylphenol, p-butylphenol, 3,4 - dimethylphenol, p-nonylphenol, p-methoxyphenol, p-butoxyphenol, 1,3-dihydroxybenzene (resorcinol), 1,4-hydroquinone, 1,3,4-trihydroxybenzene or mixtures thereof in the presence of about 2 to 3 molar proportions aluminum chloride, conveniently in o-dichlorobenzene, nitrobenzene or other suitable Friedel-Crafts reaction solvent at temperatures ranging from about 75 to 190° C. Typical compounds that may thus be prepared are 2,2'-bis(o-hydroxy-5-methylphenyl) - 5,5'-bipyrimidyl; 2,2'-bis(o,p-dihydroxyphenyl)

bipyrimidyl; 6,6'-bis(o,p-dihydroxyphenyl)-3,3'-bipyridyl; and 3,8-bis(o,p-dihydroxyphenyl)-4,7-phenanthroline.

Bis(o - hydroxyphenyl)bipyrimidyls, bipyridyls, and phenanthrolines prepared by any of the above or other methods that bear substituents among $R_{1-3}$ to $R_{5-7}$ that are chemically reactive such as hydroxy groups can be subsequently treated, for example by well-known alkylation and acylation techniques to provide derivatives also valuable as UV-screens.

This method is based on the discovery that the o-hydroxy group of the phenyl ring (critical for photostability) is far less reactive towards alkylation and acylation than other hydroxy groups when present on such phenyl, evidently because the o-hydroxy group is strongly hydrogen-bonded to the heterocyclic ring nitrogen. Thus, through control of molar proportions and other reaction conditions, as will be appreciated by those skilled in the art, it is possible to selectively alkylate and acylate the other groups, substantially without affecting the o-hydroxy group. When isomeric structres are possible, physical methods help to identify and characterize the desired structures with the hydroxy group in the desired hydrogen-bonding ortho-position. For example with reference to the nuclear magnetic spectra of these compounds the internally hydrogen-bonded o-hydroxy groups show proton signals forther downfield than hydroxy groups at other postions relative to a standard's proton signal such as that of tetramethylsilane in deuterochloroform.

The terms alklating and acylating agents are used in the generic sense. Included are diazomethane, methyl diazoacetate, methylbromide, octadecyl bromide, β-chloroethanol, ethylene oxide, methyl bromoacetate, ethyl bromoacetate, dimethyl sulfate, allyl chloride, methallyl chloride, benzyl chloride, 1,2-propyleneoxide, 3-iodopropanol, 4-chloro-2-butenol, propiolactone, acetyl chloride, acrylyl chloride, methacrylyl chloride and the like. Thus for example there may be prepared from the bis(o,p-hydroxyphenyl) compounds such further useful photostable derivatives of this invention as 2,2'-bis(2-hydroxy-4-methoxyphenyl)-5,5'-bipyrimidyl; 2,2'-bis(2-hydroxy-4-octadecyloxyphenyl)-5,5'-bipyrimidyl, 2,2'-bis(2-hydroxy-4-beta-hydroxyethyloxyphenyl) - 5,5' - bipyrimidyl; 2,2' - bis(2 - hydroxy-4-acrylyloxyphenyl)-5,5'-bipyrimidyl; and the like 6,6'-disubstituted 3,3'-bipyridyls and 3,8'-disubstituted-4,7-phenanthrolines.

Utility

As stated above, the hydroxy compounds of this invention are UV-absorbers that rapidly and efficiently dissipate such normally destructive energy through non-degradative processes. They are thus useful as light screens and photostabilizers in or on liquid or solid organic materials normally prone to deteriorate in unfiltered sunlight or other light containing UV components. One important substrate class includes resinous and polymeric materials including elastomers which may be natural or synthetic, as films, sheets, fibers, textiles or other forms presenting a surface subject to light exposure, in particular cellulosics such as cellulose acetate and cellophane, condensation polymers such as polyamides (nylon type), polyacetals (polyvinyl butyral resins), polyesters (e.g., "Mylar" polyester film), and polyurethanes and addition polymers and co-polymers of ethylene, propylene, butadiene, chloroprene, styrene, acrylonitrile, vinyl chloride, vinyl fluoride, vinylidene chloride, vinylidene fluoride, alkyl acrylate, alkyl methacrylate and mixtures thereof.

The UV-sensitive materials to be protected may be contained within or located under UV-transparent materials, which themselves may or may not be prone to photodegradation. For example, dyes and pigments in polyolefins, polyacrylates and polyacetals, may thus be protected by incorporating therewith said hydroxyaryl compounds. Similarly the lightfastness of dyes and pigments which have been melt-incorporated into or applied on fibers, e.g. polyamides, can also be improved in this way. The hydroxyaryl compounds may likewise be melt-incorporated into the fiber during its manufacture or coapplied with the dye in the textile finishing mill dyeing step.

Light-sensitive commodities like cosmetics or foods, e.g. milk, beer, potato chips, luncheon meats, bacon and other meats, dried fruits, frozen peas, beans and other vegetables, may be protected against discoloration, vitamin deterioration and light-catalyzed oxidative degradations by packaging these products in film packaging materials, e.g. polyolefins and cellophanes, containing the hydroxyaryl compounds either as part of the film composition or coated thereon to screen out the harmful rays.

Outdoor paints, coatings or other surfaces may also be protected against photodegradation by incorporating therewith or overcoating with films or other coatings containing light screeners of this invention. Thus pigmented building sidings coated with protective polyvinyl fluoride films containing light screeners of this invention are exceptionally stable to weathering and the effects of light. The light screeners may also be used in clear wood coatings, such as oil modified polyurethane, tung-oil phenolic spar varnish, exterior alkyds and nitro-cellulose coatings, to protect both the coating and the wood from darkening and deteriorating.

Adhesives and other bonding agents used in outdoor applications and prone to light degradation (for example acrylic, epoxy and polyester adhesive resins described and referred to by Tocker, U.S. Pat. No. 3,265,760), can likewise be protected by the UV screeners of this invention.

The hydroxyaryl compounds of this invention may also be incorporated as UV screens in acrylic coating compositions, particularly useful as automotive lacquers. Desirable coating compositions are more fully described by W. S. Zimmt in South African Appln. 6957/67 and U.S. Patent Application Ser. No. 588,699 filed Oct. 24, 1966 and now abandoned, which disclosure is incorporated herein by reference.

They are also useful as intermediates for the preparation of still further substituted hydroxyaryl-bipyrimidyls, bipyridyls and phenanthrolines useful as stabilizers. For example those compounds described above containing ethylenically unsaturated, polymerizable groups, may be converted to polymers wherein the photostabilizer moiety is appended to the main polymer chain.

The concentration of the photostabilizer in the substrate will normally vary with the particular stabilizer and its effectiveness, the substrate to be protected and its susceptibility to photodegradation and the effect desired. It is usually desirable to employ sufficient of the stabilizer to screen substantially all the potentially harmful radiation. In general, concentrations providing optical densities of from 1 to 2 correspond to 90% or more absorption of the incident light. Typical amounts for screening 90% or more of the light are from .05 to 5% by weight based on the substrate. Greater amounts, e.g. up to 20% by weight may be used if desired although such large amounts are generally unnecessary.

The hydroxyaryl compounds may also be advantageously employed with other additives normally employed to protect the various particular substrates described above against oxidative, thermal and other degradative processes. Included among such co-additives are phenolic antioxidants, salicylate thermal stabilizers, triaryl phosphoramides, nickel alkyl carbamates, nickel phenolates and dilauryl thiodipropionate. They may also be used with pigments, filters, plasticizers and other light absorbers if desired as long as these additives do not detract from their effectiveness for the purposes of this invention.

The following Examples illustrate the invention. Temperatures are in degrees centigrade and quantities are in parts by weight unless otherwise noted. The structure of the compounds obtained in the described procedures were confirmed by elemental analyses.

EXAMPLE 1

3,8-bis(o-hydroxyphenyl)-4,7-phenanthroline o-Metoxybenzaldehyde, (45.3 g., 0.332 mole), pyruvic acid, (30.0 g., 0.34 mole), and p-aminoacetanilide, (50 g., 0.333 mole) are refluxed in absolute ethanol (500 ml.) for 2 hrs. The product is filtered, washed with ethanol, slurried in fresh, warm ethanol with stirring, filtered again, washed and dried in vacuo to give 2-(o-methoxyphenyl)-6-acetamino-quinoline-4-carboxylic acid, melting at 263–5° C. with gas evolution.

2-(o-methoxyphenyl) - 6 - acetaminoquinoline-4-carboxylic acid, (70.7 g., 0.21 mole), is saponified in 700 ml. of water containing 70 g. of sodium hydroxide at 80° C. for 2 hrs. The solution is decolorized with charocal, filtered and acidified with conc. hydrochloric acid. The precipitated 2-(o-methoxyphenyl) - 6 - aminoquinoline-4-carboxylic acid is filtered, washed with water, dried in vacuo, M.P. 237–8° C.

The above carboxylic acid (5 g.) is mixed intimately with copper powder (5 g.) and the mixture placed in the well of a sublimation apparatus immersed in an oil bath heated at 250° C. Decarboxylation is effected at a pressure of 40 mm. Hg. for 30 min. followed by a rapid sublimation of the decarboxylated material at a pressure of about 0.25 mm. Hg and subsequent heating for an additional 2 hrs. The sublimed product is heated in 30 ml. of boiling ethanol, the mixture is filtered and 2-(o-methoxyphenyl)-6-aminoquinoline is allowed to crystallize from the filtrate. Recrystallized from ethanol (1.25 g. from 15 ml.) it melts at 123–7° C.

2-(o-methoxyphenyl)-6-aminoquinoline (18.5 g.), o-methoxybenzaldehyde (10 g.) and pyruvic acid (7 g.) are heated in 500 ml. or refluxing absolute ethanol for 18 hrs. The hot reaction mixture is filtered and the recovered 3,8-bis(o - methoxyphenyl) - 4,7 - phenanthroline-1-carboxylic acid is washed with boiling ethanol. It is further purified by dissolving in 100 ml. of 5% aq. sodium hydroxide solution with heating, filtering the solution, and precipitating the carboxylic acid with dilute aq. hydrochloric acid. The product is filtered, washed with water, and dried in vacuo to give 4.51 g., M.P. 278° C. with gas evolution.

The above 3,8-bis(o-methoxyphenyl)-4,7-phenanthroline-1-carboxylic acid, 4.0 g., is decarboxylated by heating with copper powder (6.0 g.) in quinoline (140 ml.) at 230° C. under dry nitrogen for 3½ hrs. The hot reaction mixture is filtered to remove copper and the quinoline is distilled under reduced pressure. The residue is crystallized from benzene to yield 3,8-bis(o-methoxyphenyl)-4,7-phenanthroline, melting at 239–241° C.

3,8-bis(o-methoxyphenyl)-4,7-phenanthroline described above is demethylated in 48% aq. hydrobromic acid in a sealed tube heated in an oil bath at 200° C. for 5½ hrs. After cooling and opening the tube, the precipitate is filtered and washed with aq. hydrobromic acid and then with water. The cake is slurried in 5% aq. sodium hydroxide solution which is heated to boiling with stirring. The insoluble product is filtered, washed with 5% aq. sodium hydroxide solution and water and dried in vacuo. It is then extracted with a large quantity of boiling acetic acid. The insoluble portion is sublimed in vacuo (0.025 mm. Hg) at 350° C. The sublimate is crystallized from dimethylformamide twice (0.75 g. of the sublimate is dissolved in 500 ml. of dimethylformamide at 110° C. and allowed to crystallize on cooling) to give 0.55 g. of purified 3,8-bis(o-hydroxyphenyl)-4,7-phenanthroline, a yellow compound melting sharply at 383° C. The material is dried in vacuo at 110° C.

This compound shows UV absorption maxima (with extinction coefficients in parentheses) as follows when measured in 1,8 N,N-dimethylformamide: acetonitrile mixture: 3070 A. (20,000); 3450 A. (31,000); 3650 A. (31,000).

PHOTOSTABILITY EXAMPLES

The Examples below illustrate the marked photostability of the present compounds and their suitability as UV absorbers to protect light-sensitive substrate materials against degradation by light.

Test media

Since the bipyrimidyls, bipyridyls and phenanthrolines of this invention are normally solid, they are conveniently tested, dissolved or intimately dispersed in a suitable light-transmitting carrier; for example, in solvents such as N,N-dimethylformamide and acetonitrile (representative of polar substrates) or in a film-forming transparent polymer such as a polyacrylonitrile. In general the candidate photostabilizer is incorporated into the carrier in an amount required to impart an optical density (O.D.) in the 1–1.5 range to the final composition:

A. For light exposure test, solutions were placed in 3 cc. quartz cells having a 1 cm. optical path.

B. To prepare polyacrylonitrile films the candidate photostabilizer together with one part of particulate commercial film-forming polyacrylonitrile (consisting essentially of a copolymer of 93.6 parts acrylonitrile, 6 parts methyl acrylate and 0.4 part sodium p-styrene sulfonate) and 5 parts of dimethylformamide are heated at about 100° C. for a few minutes to form a clear solution, which is poured on a clean, glass plate and spread with a doctor knife having a 16 mil clearance. The dimethylformamide is evaporated by heating such plate in a vacuum oven (60° C./about 100 mm. Hg pressure) for 2 hours, to give the final film, 1–1.3 mils thick.

Test method

A convenient measure of a compound's photostability is the inverse of the quantum yield ($\phi_R^{-1}$) of its photochemical reactions, either through self-degradation or reaction with its surroundings. Thus, $\phi_R^{-1}$ represents the average number of times a photo-activatable, i.e. light-absorbing molecule, must be photo-activated before it reacts to produce inactive products. In other words (since the number of photo-excited molecules equals the number of quanta absorbed), $\phi_R^{-1}$ is the ratio of the number of quanta absorbed to the number of molecules that have undergone photochemical reaction.

In this method, the photo-stabilizer candidate contained in a suitable substrate as described above is exposed to radiation from a standard Xenon arc lamp such that the radiation first passes through a Corning 0–54 filter to filter out wavelengths below 295 m$\mu$ and through a 10 cm. thick water barrier to remove infrared before it strikes the sample. The extinction coefficient of the test sample's longest wavelength absorption peak and the optical density (O.D.) are determined in the usual way using a Cary spectrophotometer.

The number of quanta absorbed is determined with a calibrated 935 photoelectric cell (a series of quartz diffusion discs, disposed along the length of a polished cylinder to diminish directional sensitivity and connected to a microameter) by measuring the intensities of the radation that strikes the film surface, $I_o$, and that passes through the film, $I_t$. The current difference, $I_o - I_t$, is is directly related to the total quanta absorbed and thus is useful per se for comprising compounds. The actual quanta absorbed per unit substrate volume per unit time is $k(I_o - I_t)$, where $k$ is a constant, $1.74 \times 10^{16}$ quanta/cm.$^2$/hr., determined by calibrating the cell against a uranyl oxalate actinometer according to known techniques.

$I_o$, $I_t$ and O.D. readings at the longest wavelength absorption peak are taken periodically until the optical density has decreased 10–15%, which generally requires from 100 to 1000 hours depending on the composition under test.

The number of molecules photolyzed is determined from the rate at which the optical density decreases with exposure time. This correlation is operative here because the compounds involved degrade to products which are optically inactive in the region of the monitored peak, as indicated by the fact that the peak's optical density decreases linearly with time and its wavelength remains unchanged during the indicated period.

The photostability is calculated as follows:

$$\phi_R^{-1} = 0.0286[(I_o - I_t) \cdot \epsilon]/(\Delta O.D./\Delta t)$$

where $I_o$ = the incident light intensity
$I_t$ = the transmitted light intensity
$\epsilon$ = the extinction coefficient of the photostabilizer
$O.D. = \log I_o/I_t$
$\Delta O.D./\Delta t$ = how optical density at peak absorption changes with time, or the slope, $a$, of the linear curve, $O.D. = a \cdot t + b$, where $t$ is the time in hours, $b$ the optical density at time zero, and
$0.0286$ = a composite constant including the cell calibration constant described above.

$\phi_R^{-1}$ is an objective measure of the photostability of a compound. It takes into account the decrease in optical density with time, the broadness of the absorption spectrum $(I_o - I_t)$, and the intensity of absorption ($\epsilon$). The smaller the decrease in optical density with time, the longer the UV screener will last and the longer the protection to the substrate. The broader the absorption band and the higher the extinction coefficient, the smaller is the amount of UV screener to provide a given optical density, (optical densities of 1-2 correspond to 90-99% absorption).

If equal amounts of two UV screeners having roughly equal absorption characteristics (and molecular weights) are added to a substrate and if $\phi_R^{-1}$ of one compound is ten times that of the other, then the first compound will afford protection for a period of time ten times longer.

EXAMPLES 2–3

The following table illustrates the photostabilizing qualities of the novel compounds of this invention when incorporated into polyacrylonitrile and acetonitrile-based substrates:

| Ex. | Photostabilize | Matrix | Photostability value $\Phi_R^{-1}$ |
|---|---|---|---|
| 2 | 3,8-bis(o-hydroxyphenyl)-4,7-phenanthroline. | Polyacrylonitrile | $1.6 \times 10^4$ |
| 3 | 3,8-bis(o-hydroxyphenyl)-4,7-phenanthroline. | Dimethylformamide plus acetonitrile (1:8). | $1.2 \times 10^4$ |

The foregoing detailed description has been given for clearness of understanding only and no unnecessary limitations are to be understood therefrom. The invention is not limited to the exact details shown and described, for obvious modifications will occur to those skilled in the art.

What is claimed is:

1. Compound of the formula

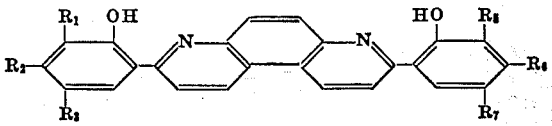

wherein $R_1$, $R_2$, $R_3$, $R_5$, $R_6$ and $R_7$ are separately selected from hydrogen, chlorine, hydroxy, primary and secondary alkyl and alkoxy, said alkyl and alkoxy groups having up to 18 carbon atoms each.

2. Claim 1 wherein $R_1$, $R_2$, $R_3$, $R_5$, $R_6$ and $R_7$ are hydrogen.

3. Claim 1 wherein $R_1$, $R_3$, $R_5$ and $R_7$ are hydrogen, and wherein $R_2$ and $R_6$ are hydroxy.

4. A process for preparing phenanthrolines which comprises:
   (A) condensing
      (1) a salicylaldehyde of the formula

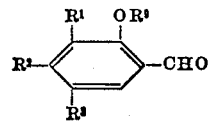

where $R_1$, $R_2$ and $R_3$ are selected from hydrogen, chlorine, hydroxy, alkyl, alkoxy and acyloxy and where $R_9$ is selected from hydrogen and lower alkyl; with
      (2) a p-acylamidoaniline; and
      (3) pyruvic acid,
      (3) pyruvic acid, to obtain a 2-(o-$R_9$O-phenyl)-4-carboxy-6-acylamidoquinoline;
   (B) deacylating said quinoline to the corresponding 4-carboxy-6-aminoquinoline;
   (C) decarboxylating said 4-carboxy compounds to obtain a 2-(o-$R_9$O-phenyl)-6-aminoquinoline;
   (D) condensing the aminoquinoline of step (C) with another molecule of compound (1) and pyruvic acid to obtain a 3,8-bis(o-$R_9$O-phenyl)-4,7-phenanthroline-1-carboxylic acid; and
   (E) decarboxylating said carboxylic acid to obtain a 3,8-bis(o-$R_9$O-phenyl)-4,7-phenanthroline.

5. Claim 4 wherein $R_1$, $R_2$ and $R_3$ are hydrogen, $R_9$ is lower alkyl and wherein the process further comprises
   (F) dealkylating the resulting 3,8-bis(o-alkoxyphenyl)-4,7-phenanthroline to obtain 3,8-bis(o-hydroxyphenyl)-4,7-phenanthroline.

References Cited
UNITED STATES PATENTS
3,249,616  5/1966  Sawa et al. ......... 260—285
FOREIGN PATENTS
762,442  11/1956  Great Britain ...... 260—288 P
OTHER REFERENCES
Wiley et al.: In Chem. Abstr., vol. 52, col. 16355b, (1958).

DONALD G. DAUS, Primary Examiner

PO-1050
(5/69)

UNITED STATES PATENT OFFICE
CERTIFICATE OF CORRECTION

Patent No. 3,812,123       Dated May 21, 1974

Inventor(s) Jan-Erik Anders Otterstedt and Richard Pater

It is certified that error appears in the above-identified patent and that said Letters Patent are hereby corrected as shown below:

In column 12, lines 16 to 48, Claims 4 and 5 should be deleted.

Signed and sealed this 8th day of October 1974.

(SEAL)
Attest:

McCOY M. GIBSON JR.           C. MARSHALL DANN
Attesting Officer             Commissioner of Patents